(12) United States Patent
Yang et al.

(10) Patent No.: US 8,615,277 B2
(45) Date of Patent: Dec. 24, 2013

(54) ELECTRONIC DEVICE HAVING FUNCTIONAL BLOCKS INDIVIDUALLY CONTROLLED TO SELECTIVELY ENTER POWER-SAVING MODE AND RELATED POWER CONTROL METHOD THEREOF

(75) Inventors: Ying-Ting Yang, Taipei County (TW); Chiao-Chi Huang, Hsinchu County (TW)

(73) Assignee: Mediatek Inc., Science-Based Industrial Park, Hsin-Chu (TW)

(*) Notice: Subject to any disclaimer, the term of this patent is extended or adjusted under 35 U.S.C. 154(b) by 334 days.

(21) Appl. No.: 12/944,745

(22) Filed: Nov. 12, 2010

(65) Prior Publication Data

US 2012/0122417 A1    May 17, 2012

(51) Int. Cl.
*H01Q 11/12* (2006.01)
*H04B 1/04* (2006.01)
*H04B 1/16* (2006.01)
*H04B 1/38* (2006.01)

(52) U.S. Cl.
USPC ............. 455/574; 455/127.5; 455/343.1; 370/318

(58) Field of Classification Search
USPC ............. 455/127.1–127.5, 343.1–343.4, 574; 370/318
See application file for complete search history.

(56) References Cited

U.S. PATENT DOCUMENTS

| | | | |
|---|---|---|---|
| 5,925,132 A | 7/1999 | Kadokura | |
| 6,356,538 B1 * | 3/2002 | Li | 370/311 |
| 6,657,979 B1 | 12/2003 | Patel | |
| 6,978,149 B1 * | 12/2005 | Morelli et al. | 455/522 |
| 7,516,347 B2 | 4/2009 | Kim | |
| 7,584,372 B2 | 9/2009 | Hsu | |
| 7,606,602 B2 | 10/2009 | Zhang | |
| 7,697,907 B2 | 4/2010 | McCorkle | |
| 8,014,748 B2 * | 9/2011 | Shi et al. | 455/343.1 |
| 8,270,932 B2 * | 9/2012 | Kim et al. | 455/343.2 |
| 2002/0094840 A1 * | 7/2002 | Hattori et al. | 455/558 |
| 2004/0185857 A1 * | 9/2004 | Lee et al. | 455/445 |
| 2006/0218424 A1 | 9/2006 | Abramovici | |
| 2006/0279891 A1 | 12/2006 | Dieffenderfer | |
| 2007/0037609 A1 | 2/2007 | Zhang | |
| 2007/0049238 A1 * | 3/2007 | Chen | 455/343.1 |
| 2007/0079159 A1 | 4/2007 | Wong | |
| 2007/0205872 A1 * | 9/2007 | Kim et al. | 340/10.33 |
| 2007/0213028 A1 * | 9/2007 | Shohara et al. | 455/343.1 |
| 2008/0056169 A1 * | 3/2008 | Pattabiraman et al. | 370/311 |
| 2008/0126816 A1 * | 5/2008 | Prete et al. | 713/323 |
| 2008/0184051 A1 * | 7/2008 | Cheong et al. | 713/323 |
| 2009/0285142 A1 | 11/2009 | Zhang | |
| 2010/0240319 A1 * | 9/2010 | Matsuo | 455/68 |
| 2012/0163481 A1 * | 6/2012 | Ebner et al. | 375/259 |
| 2012/0165080 A1 * | 6/2012 | Islam et al. | 455/574 |

* cited by examiner

*Primary Examiner* — Simon Nguyen
(74) *Attorney, Agent, or Firm* — Winston Hsu; Scott Margo

(57) ABSTRACT

An electronic device includes a first functional block, a second functional block, and a control circuit. The first functional block has a first wake-up guard time requirement. The second functional block has a second wake-up guard time requirement which is different from the first wake-up guard time requirement. The control circuit is coupled to the first functional block and the second functional block, and implemented for selectively controlling the first functional block to switch from a normal mode to a power-saving mode by referring to the first wake-up guard time requirement, and selectively controlling the second functional block to switch from the normal mode to the power-saving mode by referring to the second wake-up guard time requirement.

22 Claims, 13 Drawing Sheets

ELECTRONIC DEVICE HAVING FUNCTIONAL BLOCKS INDIVIDUALLY CONTROLLED TO SELECTIVELY ENTER POWER-SAVING MODE AND RELATED POWER CONTROL METHOD THEREOF

BACKGROUND

The disclosed embodiments of the present invention relate to reducing the overall power consumption of an electronic device, and more particularly, to an electronic device having functional blocks that are individually controlled to selectively enter a power-saving mode and related power control method thereof.

Power consumption is crucial to the performance of certain applications, especially portable devices. In general, an electronic device is capable of switching between a normal mode and a power-saving mode (e.g., a sleep mode or a power-down mode) in order to reduce the overall power consumption. Taking a cellular phone with a wireless communication receiver included therein for example, the battery life is a major issue for the consumer. When the wireless communication receiver is allowed to leave the normal mode and enter the power-saving mode, a conventional design is to cut off power sources/clock sources of circuit components included in the wireless communication receiver for maximum power consumption reduction. However, when deciding whether to switch the wireless communication receiver into the power-saving mode, the conventional design has to consider the wireless communication receiver as a whole. That is, in accordance with the conventional design, circuit components included in the wireless communication receiver are all controlled to enter the power-saving mode or stay in the normal mode, which lacks flexibility in reducing the power consumption.

Thus, there is a need for an innovative power control scheme which is capable of controlling operational modes of a plurality of functional blocks individually for achieving improved power saving performance.

SUMMARY

In accordance with exemplary embodiments of the present invention, an electronic device having functional blocks that are individually controlled to selectively enter a power-saving mode and related power control method thereof are proposed to solve the above-mentioned problem.

According to a first aspect of the present invention, an exemplary electronic device is disclosed. The exemplary electronic device includes a first functional block, a second functional block, and a control circuit. The first functional block has a first wake-up guard time requirement. The second functional block has a second wake-up guard time requirement which is different from the first wake-up guard time requirement. The control circuit is coupled to the first functional block and the second functional block, and implemented for selectively controlling the first functional block to switch from a normal mode to a power-saving mode by referring to the first wake-up guard time requirement, and selectively controlling the second functional block to switch from the normal mode to the power-saving mode by referring to the second wake-up guard time requirement.

According to a second aspect of the present invention, an exemplary power control method is disclosed. The exemplary power control method includes the following steps: selectively controlling a first functional block of an electronic device to switch from a normal mode to a power-saving mode by referring to a first wake-up guard time requirement of the first functional block; and selectively controlling a second functional block of the electronic device to switch from the normal mode to the power-saving mode by referring to a second wake-up guard time requirement of the second functional block, wherein the second wake-up guard time requirement is different from the first wake-up guard time requirement.

According to a third aspect of the present invention, an exemplary electronic device is disclosed. The exemplary electronic device includes a plurality of functional blocks and a control circuit. The functional blocks have different wake-up guard time requirements, respectively. The control circuit is coupled to the functional blocks, and implemented for controlling a part of the functional blocks to switch from a normal mode to a power-saving mode by referring to the wake-up guard time requirements of the functional blocks.

According to a fourth aspect of the present invention, an exemplary electronic device includes a plurality of functional blocks and a control circuit. The functional blocks have different wake-up guard time requirements, respectively. The control circuit is coupled to the functional blocks, and used for calculating a plurality of wake-up time points for the functional blocks according to the different wake-up guard time requirements and controlling the functional blocks to switch from a power-saving mode to a normal mode by referring to the wake-up time points of the functional blocks, respectively.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes an electronic device having functional blocks that are individually controlled by a proposed power control scheme to selectively enter a power-saving mode. In this way, the power saving performance can be effectively improved. It should be noted that the power-saving mode mentioned hereinafter may be a sleep mode, a power-down mode, or any operational mode which makes a functional block have reduced power consumption. In other words, a functional block operating under the power-saving mode would consume less power/current than the functional block operating under the normal mode. By way of example, but not limitation, when a functional block enters the power-saving mode, the functional block may operate according to an operating clock with a slower clock rate, or may be turned off by cutting off the required power supply. To put it simply, a functional block is regarded as operating under the power-saving mode as long as the functional block is forced to reduce its power consumption due to one or more power-saving schemes applied thereto. As the present invention focuses on how to control a functional block to switch between the normal mode and the power-saving mode, details directed to the power-saving scheme employed for reducing the power consumption of the functional block is omitted here for brevity. Moreover, each functional block mentioned hereinafter may include one or more circuit components.

Figure 1:
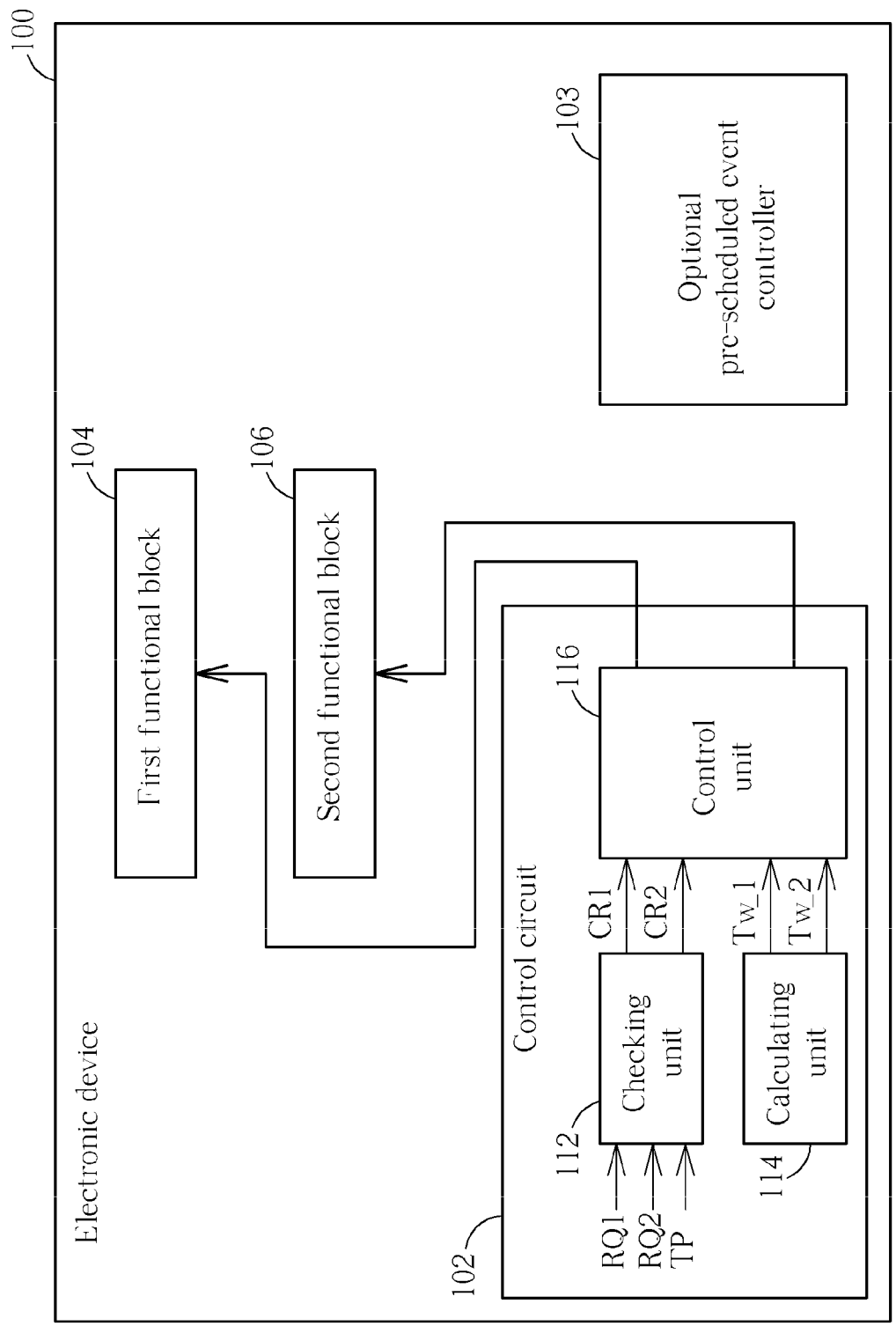
FIG. 1 is a block diagram illustrating an electronic device according to a first exemplary embodiment of the present invention.

FIG. 1 is a block diagram illustrating an electronic device according to a first exemplary embodiment of the present invention. The exemplary electronic device 100 includes, but is not limited to, a control circuit 102, an optional pre-scheduled event controller 103, and a plurality of functional blocks having different wake-up guard time requirements. It should be noted that only two functional blocks (i.e., a first functional block 104 having a first wake-up guard time requirement RQ1 and a second functional block 106 having a second wake-up guard time requirement RQ2 different from the first wake-up guard time requirement RQ1) are shown in FIG. 1 for illustrative purposes. It means that the concept of this embodiment can be extended to other embodiments with more than two functional blocks. Actually, the total number of the functional blocks included in the electronic device 100 is adjustable, depending upon the actual design consideration. In this exemplary embodiment, the control circuit 102 includes, but is not limited to, a checking unit 112, a calculating unit 114, and a control unit 116. The control circuit 102 is coupled to the first functional block 104 and the second functional block 106. The control circuit 102 is utilized for selectively controlling the first functional block 104 to switch from a normal mode to a power-saving mode by referring to the first wake-up guard time requirement RQ1, and selectively controlling the second functional block 106 to switch from the normal mode to the power-saving mode by referring to the second wake-up guard time requirement RQ2.

The first wake-up guard time requirement RQ1 defines a minimum time period, starting from a first wake-up time point and ending at a predetermined time point, required for guaranteeing that waking up the first functional block 104 at the first wake-up time point is able to make the electronic device 100 ready to work at the predetermined time point. Similarly, the second wake-up guard time requirement RQ2 defines a minimum time period, starting from a second wake-up time point and ending at the same predetermined time point, required for guaranteeing that waking up the second functional block 106 at the second wake-up time point is able to make the electronic device 100 ready to work at the predetermined time point. As the first wake-up guard time requirement RQ1 is different from the second wake-up guard time requirement RQ2, the minimum time periods mentioned above are different from each other. That is, the first wake-up time point is different from the second wake-up time point.

In this exemplary embodiment shown in FIG. 1, a wake-up procedure of the second functional block 106 is independent of a wake-up procedure of the first functional block 104. For instance, the first functional block 104 can perform its intended functionality no matter whether the second functional block 106 is ready to work, and vise versa. Therefore, there is no limitation to the sequence of waking up the first functional block 104 and the second functional block 106 when the first functional block 104 and the second functional block 106 enter the power-saving mode. The first wake-up guard time requirement RQ1 may simply define a stabilization time period that should be preserved before the predetermined time point at which the first functional block 104 is required to be ready to work. That is, the stabilization time period is preserved to make the first functional block 104 become stable no later than the predetermined time point. Similarly, the second wake-up guard time requirement RQ2 may simply define a stabilization time period that should be preserved before the predetermined time point at which the second functional block 106 is required to be ready to work. That is, the stabilization time period is preserved to make the second functional block 106 become stable no later than the predetermined time point.

However, the aforementioned settings of the first wake-up guard time requirement RQ1 and the second wake-up guard time requirement RQ2 are for illustrative purposes only, and are not meant to be limitations of the present invention. The settings of the first wake-up guard time requirement RQ1 and the second wake-up guard time requirement RQ2 may be adjusted according to actual design consideration.

Figure 2:
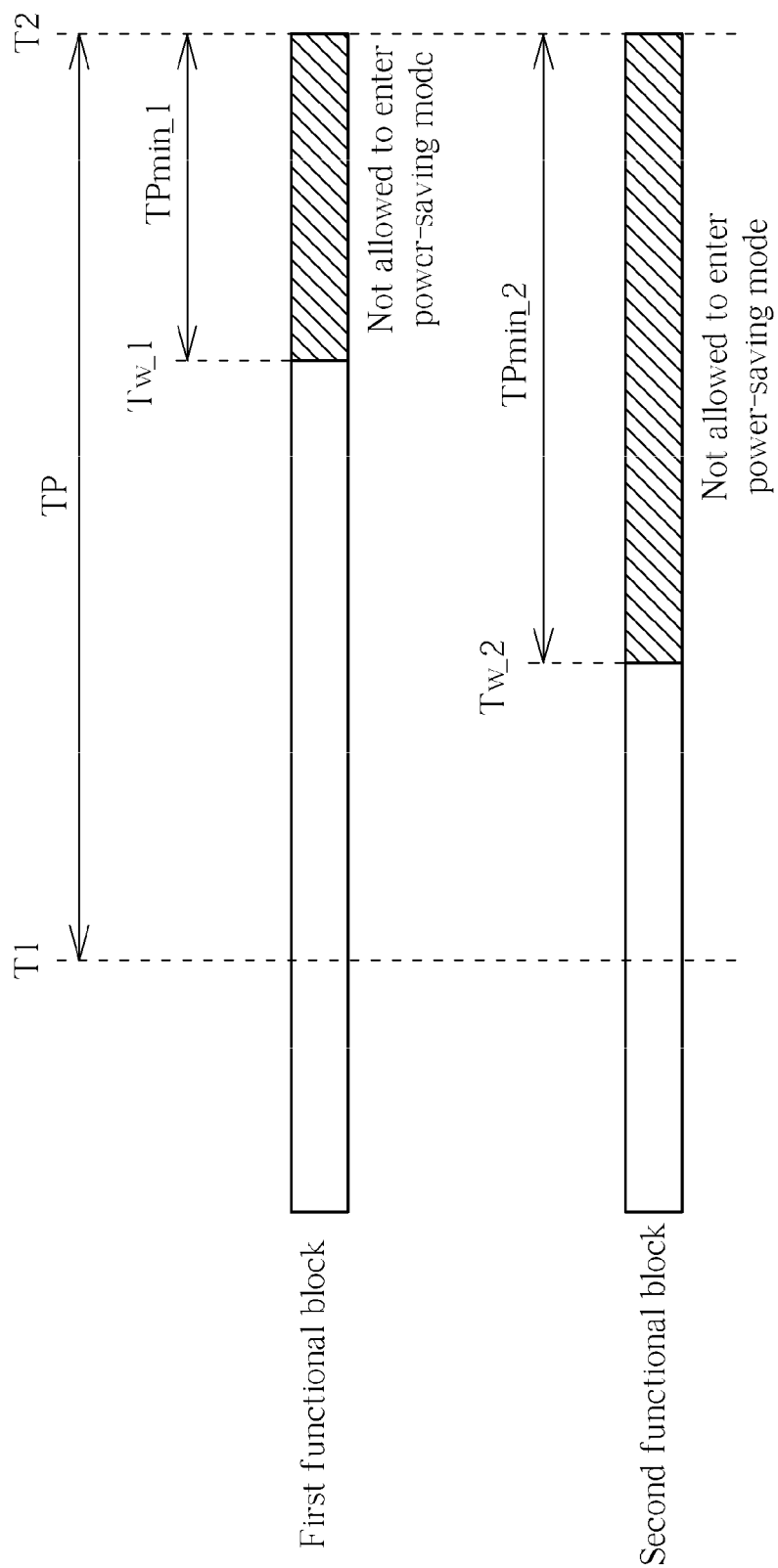
FIG. 2 is a diagram illustrating a first example of a minimum time period requested by a first wake-up guard time requirement of a first functional block in FIG. 1, a minimum time period requested by a second wake-up guard time requirement of a second functional block in FIG. 1, and a time period between a first time point and a second time point.

Technical features of the control circuit 102 are detailed as follows. The checking unit 112 is arranged to generate a first checking result CR1 by checking if a time period TP between a first time point T1 and a second time point T2 satisfies the first wake-up guard time requirement RQ1 and generate a second checking result CR2 by checking if the time period TP between the first time point T1 and the second time point T2 satisfies the second wake-up guard time requirement RQ2. Please refer to FIG. 2, which is a diagram illustrating a first example of the minimum time period $TP_{min\_1}$ (e.g., a stabilization time period of the first functional block 104) requested by the first wake-up guard time requirement RQ1, the minimum time period $TP_{min\_2}$ (e.g., a stabilization time period of the second functional block 106) requested by the second wake-up guard time requirement RQ2, and the time period TP between the first time point T1 and the second time point T2. As shown in FIG. 2, the minimum time period $TP_{min\_1}$ is equal to a time period delimited by a permissible latest wake-up time point $T_{w\_1}$ for the first functional block 104 and the second time point T2, and the other minimum time period $TP_{min\_2}$ is equal to a time period delimited by a permissible latest wake-up time point $T_{w\_2}$ for the second functional block 106 and the second time point T2.

By way of example, but not limitation, the first time point T1 may be a time point at which a system idle event occurs, and the second time point T2 may be a scheduled time point at which the first functional block 104 and the second functional block 106 are required to be ready to work. For example, the electronic device 100 may be a wireless communication device such as a receiver of a Wi-Fi apparatus. Thus, the electronic device 100 may be required to periodically listen to a beacon transmitted from a node, either an access point (AP) or a station, at a target beacon transmission time (TBTT). The above-mentioned second time point T2 therefore may be a TBTT. Therefore, in a case where the electronic device 100 is a wireless communication device, the pre-scheduled event controller 103 may be implemented using a hardware timer for triggering an interrupt/event at a predetermined/scheduled time point (e.g., TBTT). However, using the pre-scheduled event controller 103 in the electronic device 100 is for illustrative purposes only. In an alternative design where the electronic device 100 is employed in applications other than the wireless communication application, the pre-scheduled event controller 103 may be omitted. To put it simply, the time point T2 may be determined by any feasible means as long as the information of the time point T2 required by the proposed power control scheme for determining the time period TP is correctly provided to the control circuit 102.

As can be seen from FIG. 2, the time period TP is longer than each of the minimum time periods $TP_{min\_1}$ and $TP_{min\_2}$. Therefore, the first checking result CR1 generated from the checking unit 112 would indicate that the time period TP satisfies the first wake-up guard time requirement RQ1, and the second checking result CR2 generated from the checking unit 112 would also indicate that the time period TP satisfies the second wake-up guard time requirement RQ2.

The control unit 116 is coupled to the checking unit 112, and utilized for controlling the first functional block 104 to switch between the normal mode and the power-saving mode and controlling the second functional block 106 to switch between the normal mode and the power-saving mode. More specifically, the control unit 116 controls the first functional block 104 to enter the power-saving mode when the first checking result CR1 indicates that the time period TP satisfies the first wake-up guard time requirement RQ1, and controls the second functional block 106 to enter the power-saving mode when the second checking result CR2 indicates that the time period TP satisfies the second wake-up guard time requirement RQ2. Regarding the example shown in FIG. 2, both of the first functional block 104 and the second functional block 106 would switch from the normal mode to the power-saving mode at the time point T1 under the control of the control unit 116.

Regarding the calculating unit 114, it is coupled to the control unit 116 and utilized for calculating a first wake-up time point (e.g., the aforementioned permissible latest wake-up time point $T_{w\_1}$) of the first functional block 104 according to the first wake-up guard time requirement RQ1 when the first functional block 104 enters the power-saving mode, and calculating a second wake-up time point (e.g., the aforementioned permissible latest wake-up time point $T_{w\_2}$) of the second functional block 106 according to the second wake-up guard time requirement RQ2 when the second functional block 106 enters the power-saving mode. Thus, after receiving information of the wake-up time points from the calculating unit 114, the control unit 116 controls the first functional block 104 to switch from the power-saving mode to the normal mode at the designated wake-up time point $T_{w\_1}$, and controls the second functional block 106 to switch from the power-saving mode to the normal mode at the designated wake-up time point $T_{w\_2}$. To put it simply, when functional blocks with different wake-up guard time requirements are controlled by the controller 102 to enter the power-saving mode, the control circuit 102 is responsible for calculating wake-up time points for the functional blocks according to the different wake-up guard time requirements, and controlling the functional blocks to switch from the power-saving mode to the normal mode by referring to wake-up time points of the functional blocks, respectively.

Figure 3:
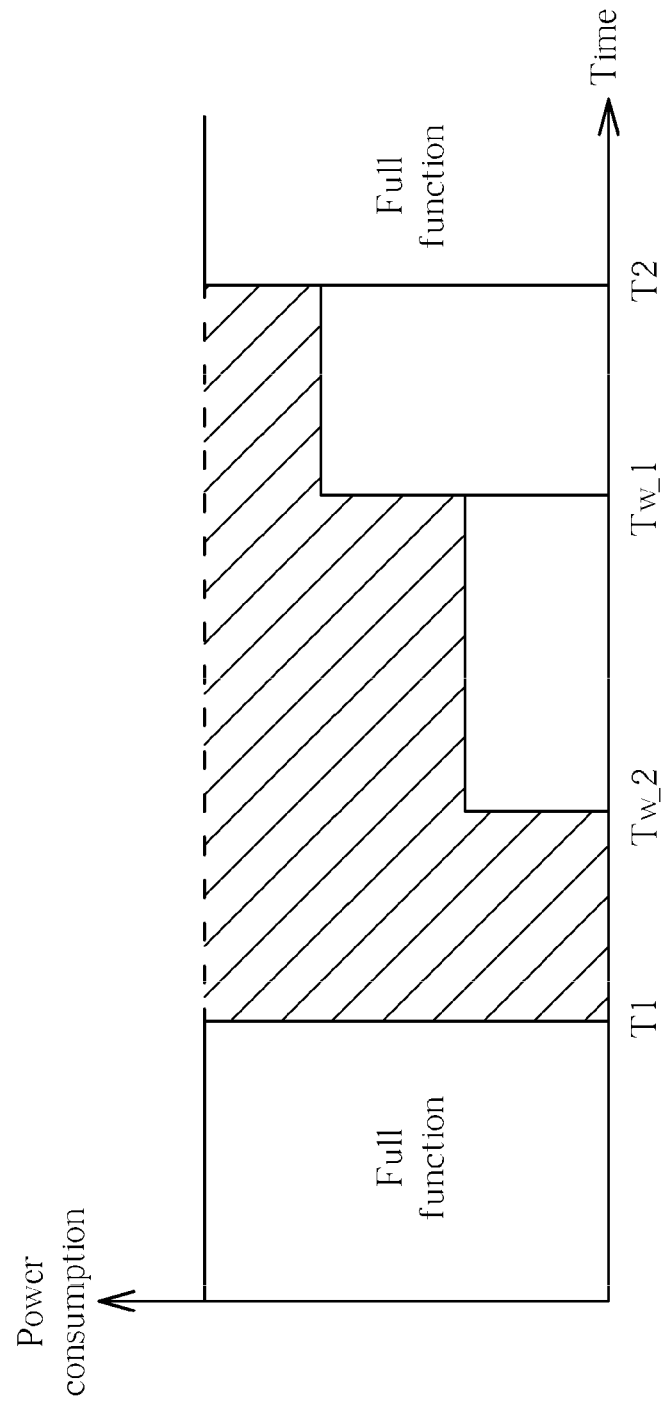
FIG. 3 is a diagram illustrating the power consumption variation of the electronic device in FIG. 1 under the condition where both of the first wake-up guard time requirement and the second wake-up guard time requirement are satisfied.

Please refer to FIG. 3, which is a diagram illustrating the power consumption variation of the electronic device 100 under the condition where both of the first wake-up guard time requirement RQ1 and the second wake-up guard time requirement RQ2 are satisfied. As can be seen from FIG. 2 and FIG. 3, the first functional block 104 and the second functional block 106 both enter the power-saving mode at the first time point T1 (e.g., at a time point where the system is idle). Suppose that the power supplies/power sources of the first functional block 104 and the second functional block 106 are cut off when the first functional block 104 and the second functional block 106 enter the power-saving mode. The power consumption would be reduced from a maximum level to a minimum level at the first time point T1. Next, the second functional block 106 and the first functional block 104 sequentially leave the power-saving mode under the control of the control unit 116 due to the fact that the first wake-up time point $T_{w\_}1$ is later than the second wake-up time point $T_{w\_}2$. Therefore, the power consumption would be increased from the minimum level to higher levels. At the second time point T2 (i.e., a pre-scheduled/predetermined time point where the first functional block 104 and the second functional block 106 are required to be ready to work), the power consumption is increased to the maximum level again. It should be noted that the area marked by oblique lines represents the power saved due to the proposed power control scheme.

Figure 4:
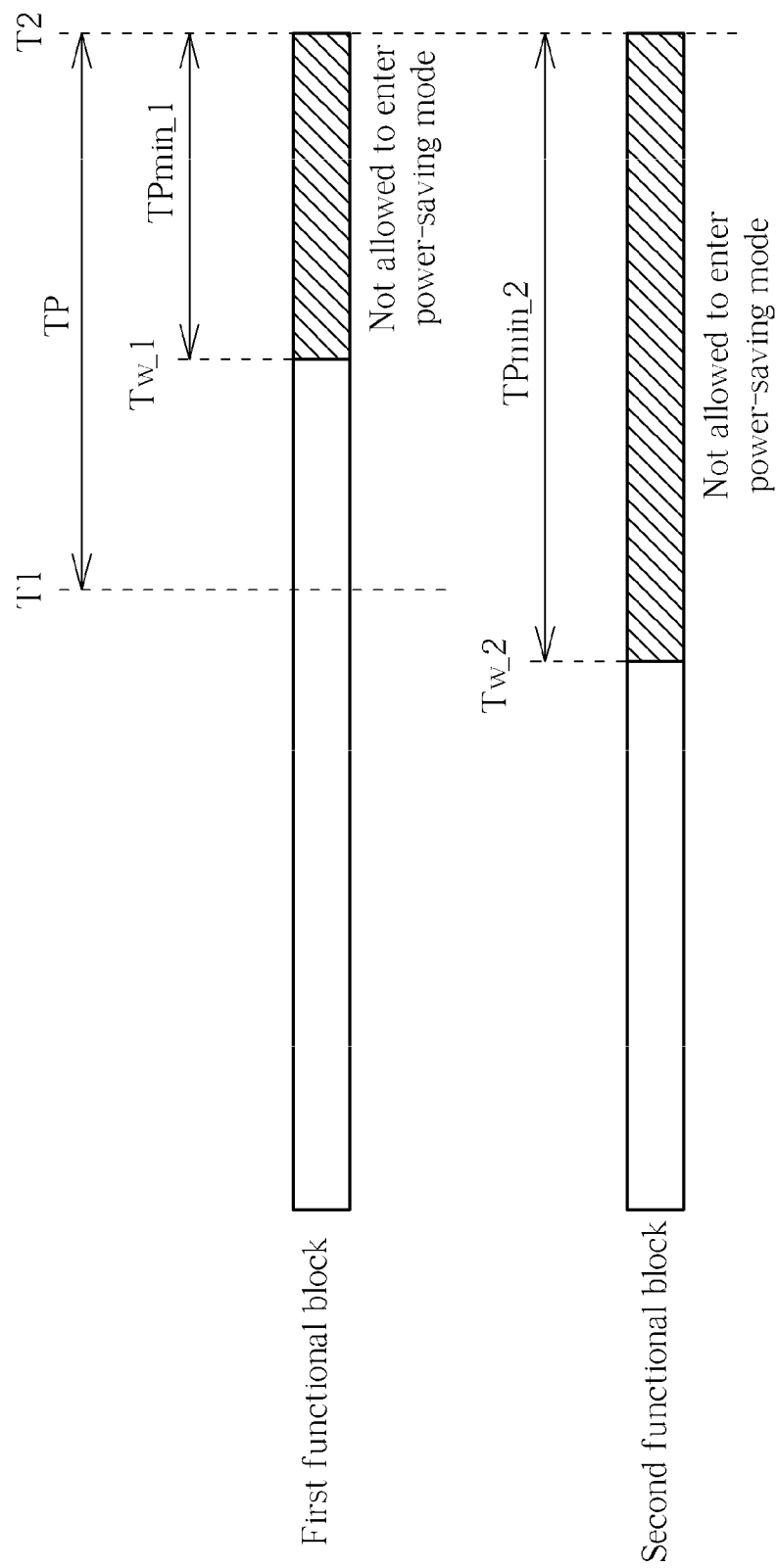
FIG. 4 is a diagram illustrating a second example of the minimum time period requested by the first wake-up guard time requirement of the first functional block in FIG. 1, the minimum time period requested by the second wake-up guard time requirement of the second functional block in FIG. 1, and the time period between the first time point and the second time point.

Please refer to FIG. 4, which is a diagram illustrating a second example of the minimum time period $TP_{min\_}1$ (e.g., a stabilization time period of the first functional block 104) requested by the first wake-up guard time requirement RQ1, the minimum time period $TP_{min\_}2$ (e.g., a stabilization time period of the second functional block 106) requested by the second wake-up guard time requirement RQ2, and the time period TP between the first time point T1 and the second time point T2. As can be seen from FIG. 4, the time period TP is longer than the minimum time period $TP_{min\_}1$, but is shorter than the other minimum time period $TP_{min\_}2$. Therefore, the first checking result CR1 generated from the checking unit 112 would indicate that the time period TP satisfies the first wake-up guard time requirement RQ1, and the second checking result CR2 generated from the checking unit 112 would indicate that the time period TP does not satisfy the second wake-up guard time requirement RQ2. Regarding the example shown in FIG. 4, the control unit 116 controls the first functional block 104 to enter the power-saving mode at the first time point T1 since the first checking result CR1 indicates that the time period TP satisfies the first wake-up guard time requirement RQ1, and makes the second functional block 106 stay in the normal mode since the second checking result CR2 indicates that the time period TP does not satisfy the second wake-up guard time requirement RQ2. Regarding the calculating unit 114, it calculates the first wake-up time point (e.g., the aforementioned permissible latest wake-up time point $T_{w\_}1$) of the first functional block 104 according to the first wake-up guard time requirement RQ1 when the first functional block 104 enters the power-saving mode. As the second functional block 106 is not allowed to enter the power-saving mode, the calculating unit 114 therefore does not calculate a wake-up time point for the second functional block 106. Next, the control unit 116 will control the first functional block 104 to switch from the power-saving mode to the normal mode at the designated wake-up time point $T_{w\_}1$.

Figure 5:
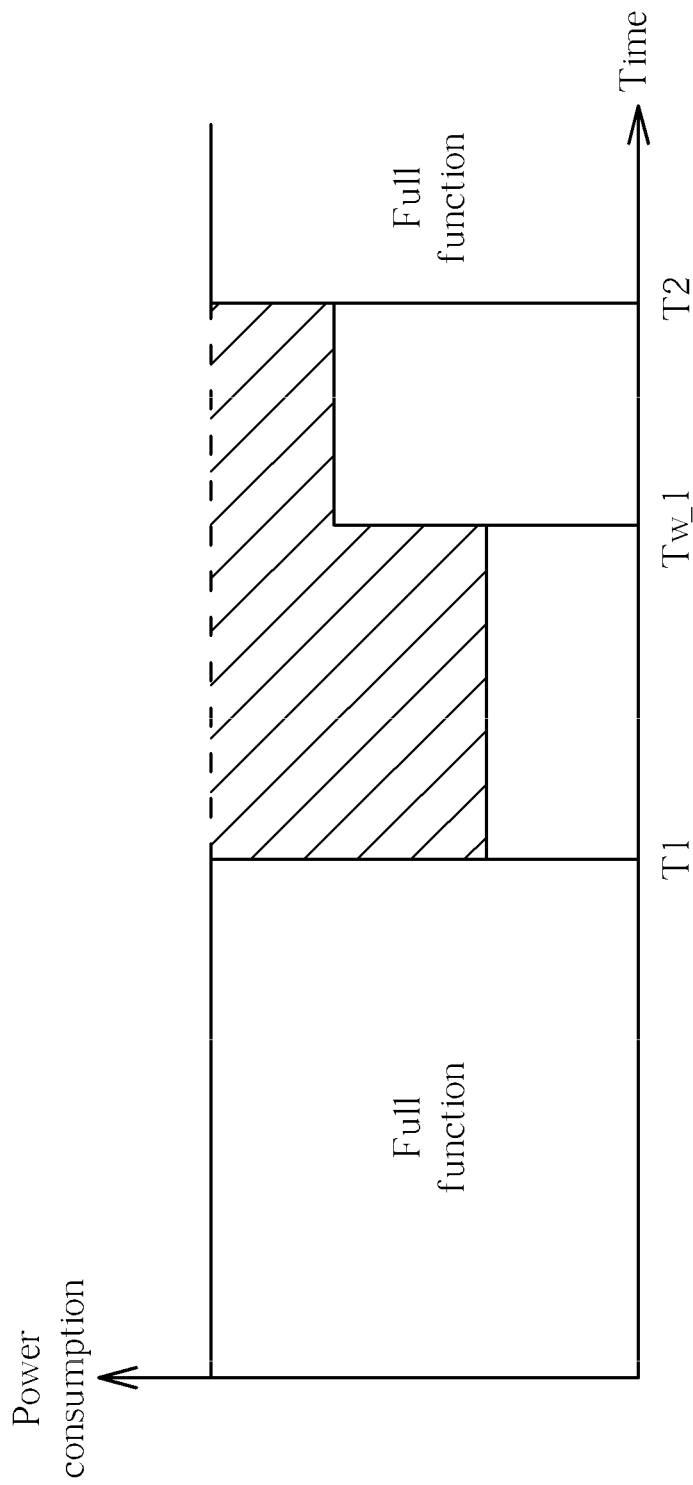
FIG. 5 is a diagram illustrating the power consumption variation of the electronic device in FIG. 1 under the condition where only one of the first wake-up guard time requirement and the second wake-up guard time requirement is satisfied.

Please refer to FIG. 5, which is a diagram illustrating the power consumption variation of the electronic device 100 under the condition where only one of the first wake-up guard time requirement RQ1 and the second wake-up guard time requirement RQ2 is satisfied. As can be seen from FIG. 5, the first functional block 104 enters the power-saving mode at the first time point T1 (e.g., at a time point where the system is idle). At the first time point T1, the power consumption is reduced from a maximum level to a lower level which is higher than the minimum level shown in FIG. 3 due to the fact that the second functional block 106 is still operating under the normal mode. Next, the first functional block 104 leaves the power-saving mode at the first wake-up time point $T_{w\_}1$ under the control of the control unit 116. Therefore, the power consumption would be increased to a higher level accordingly. At the second time point T2 (i.e., a pre-scheduled/predetermined time point where the first functional block 104 and the second functional block 106 are required to be ready to work), the power consumption is increased to the maximum level since the first functional block 104 and the second functional block 106 are both stable and ready to work. It should be noted that the area marked by oblique lines represents the power saved due to the proposed power control scheme.

Regarding the example shown in FIG. 4, the electronic device 100 is partially active as the first functional block 104 enters the power-saving mode while the second functional block 106 remains in the normal mode. Though the second functional block 106 is not allowed to enter the power-saving mode, the power consumption is reduced during the time period TP, as shown in FIG. 5. In contrast to the conventional design of making all circuit components either stay in the normal mode or enter the power-saving mode, the proposed power control scheme of the present invention can control the functional blocks individually, thereby permitting the electronic device to be partially active for power consumption reduction. Briefly summarized, the electronic device 100 includes a plurality of functional blocks having different wake-up guard time requirements, respectively, and the control circuit 116 of the electronic device 100 is capable of controlling a part of the functional blocks to switch from a normal mode to a power-saving mode by referring to the wake-up guard time requirements of the functional blocks, wherein each functional block included in the part of the functional blocks has a wake-up guard time requirement that is satisfied by a time period between a first time point (e.g., a time point at which a system idle event occurs) and a second time point (e.g., a scheduled time point at which the functional blocks are required to be ready to work), and each functional block included in a remaining part of the functional blocks has a wake-up guard time requirement that is not satisfied by the time period between the first time point and the second time point.

Figure 6:
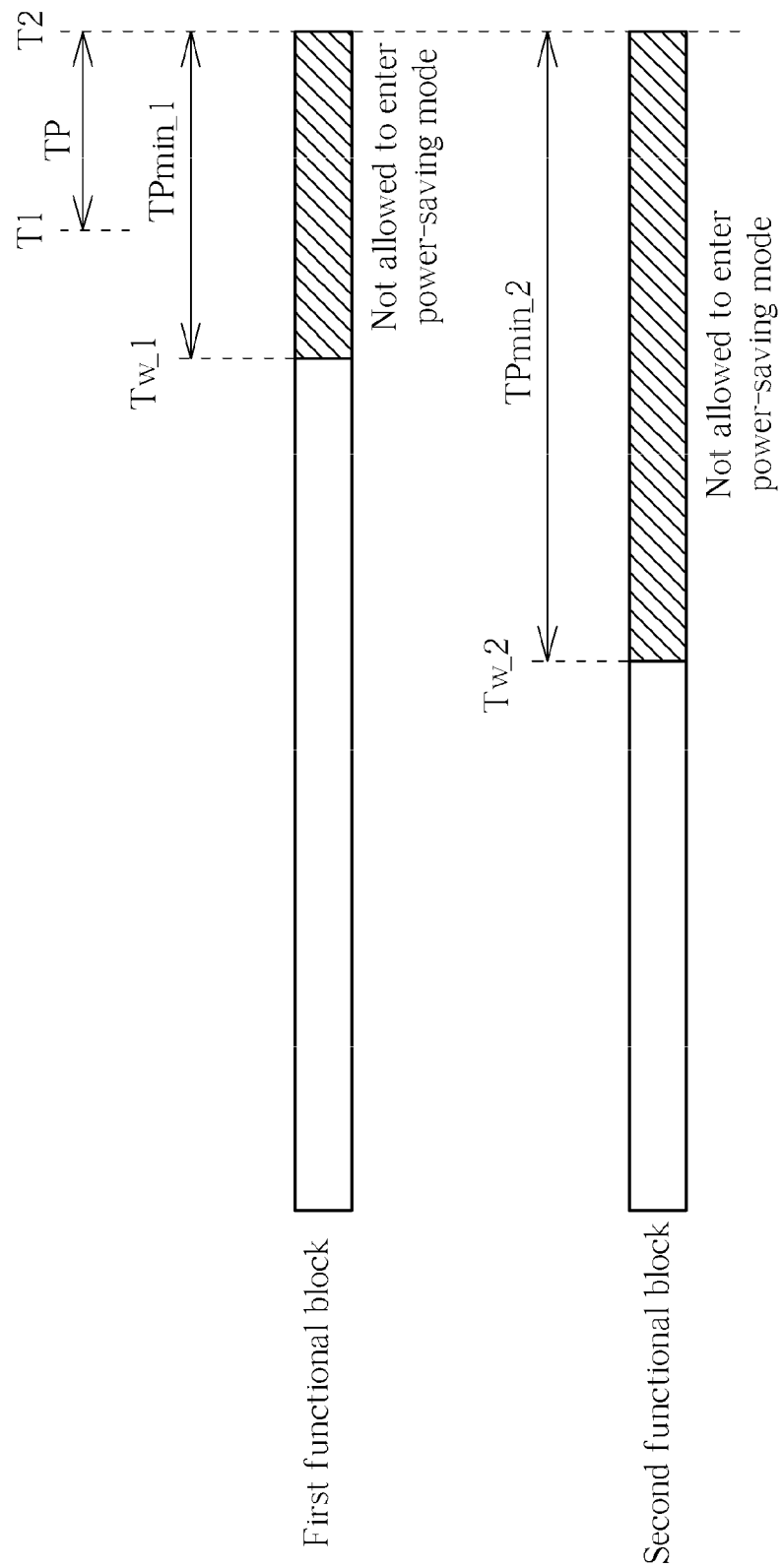
FIG. 6 is a diagram illustrating a third example of the minimum time period requested by the first wake-up guard time requirement of the first functional block in FIG. 1, the minimum time period requested by the second wake-up guard time requirement of the second functional block in FIG. 1, and the time period between the first time point and the second time point.

Please refer to FIG. 6, which is a diagram illustrating a third example of the minimum time period $TP_{min\_}1$ (e.g., a stabilization time period) requested by the first wake-up guard time requirement RQ1, the minimum time period $TP_{min\_}2$ (e.g., a stabilization time period) requested by the second wake-up guard time requirement RQ2, and the time period TP between the first time point T1 and the second time point T2. As can be seen from FIG. 6, the time period TP is shorter than each of the minimum time periods $TP_{min\_}1$ and $TP_{min\_}2$. Therefore, the first checking result CR1 generated from the checking unit 112 would indicate that the time period TP does not satisfy the first wake-up guard time requirement RQ1, and the second checking result CR2 generated from the checking unit 112 would also indicate that the time period TP does not satisfy the second wake-up guard time requirement RQ2. Regarding the example shown in FIG. 6, the control unit 116 makes the first functional block 104 stay in the normal mode since the first checking result CR1 indicates that the time period TP does not satisfy the first wake-up guard time requirement RQ1, and makes the second functional block 106 stay in the normal mode since the second checking result CR2 indicates that the time period TP does not satisfy the second wake-up guard time requirement RQ2. As none of the first functional block 104 and the second functional block 106 is allowed to enter the power-saving mode, the calculating unit 114 does not calculate any wake-up time point for the first functional block 104 and the second functional block 106. In addition, the power consumption would be kept at the maximum level during the time period TP due to the fact that neither the first functional block 104 nor the second functional block 106 enters the power-saving mode.

Figure 7:
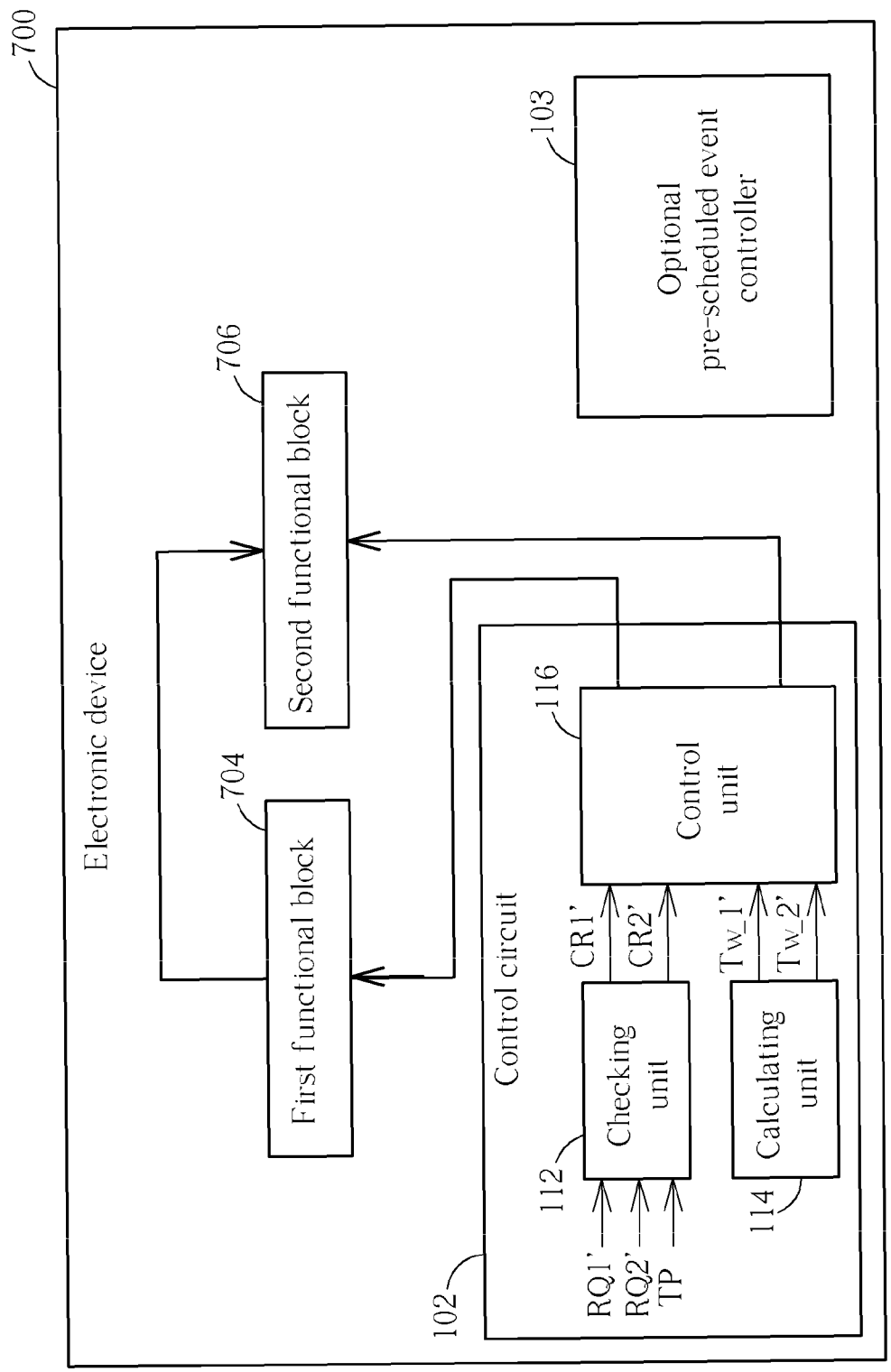
FIG. 7 is a block diagram illustrating an electronic device according to a second exemplary embodiment of the present invention.

FIG. 7 is a block diagram illustrating an electronic device according to a second exemplary embodiment of the present invention. The exemplary electronic device 700 includes, but is not limited to, the control circuit 102, the optional pre-scheduled event controller 103, and a plurality of functional blocks having different wake-up guard time requirements. It should be noted that only two functional blocks (i.e., a first functional block 704 having a first wake-up guard time requirement RQ1' and a second functional block 706 having a second wake-up guard time requirement RQ2' different from the first wake-up guard time requirement RQ1') are shown in FIG. 7 for illustrative purposes. Actually, the total number of the functional blocks in the electronic device 700 is adjustable, depending upon the design consideration. As the operations and functions of the control circuit 102 and the optional pre-scheduled event controller (e.g., a hardware timer) 103 are detailed in above paragraphs, further description is omitted here for brevity.

The major difference between the electronic device 700 in FIG. 7 and the electronic device 100 in FIG. 1 is the design of the first functional block and the second function block. In this exemplary embodiment, a wake-up procedure of the second functional block 706 is dependent on a wake-up procedure of the first functional block 704. The first wake-up guard time requirement RQ1' defines a minimum time period, starting from a first wake-up time point and ending at a predetermined time point, required for guaranteeing that waking up the first functional block 704 at the first wake-up time point is able to make the electronic device 700 ready to work at the predetermined time point. Similarly, the second wake-up guard time requirement RQ2' defines a minimum time period, starting from a second wake-up time point and ending at the same predetermined time point, required for guaranteeing that waking up the second functional block 706 at the second wake-up time point is able to make the electronic device 700 ready to work at the predetermined time point. As the first wake-up guard time requirement RQ1' is different from the second wake-up guard time requirement RQ2', the minimum time periods mentioned above are different from each other. That is, the first wake-up time point is different from the second wake-up time point.

As the second functional block 706 cannot successfully perform its intended functionality unless the first functional block 704 is ready to work, there is a limitation to the sequence of waking up the first functional block 704 and the second functional block 706. By way of example, but not limitation, the first functional block 704 may be a clock generator which generates an operating clock required by the second functional block 706 such as a microprocessor, or the first functional block 704 may be a voltage regulator which generates an operating voltage required by the second functional block 706. Thus, the aforementioned minimum time period defined by the first wake-up guard time requirement RQ1' must be longer than the aforementioned minimum time period defined by the second wake-up guard time requirement RQ2' since the minimum time period defined by the first wake-up guard time requirement RQ1' must include the minimum time period defined by the second wake-up guard time requirement RQ2' due to the wake-up procedure dependency. For example, the second wake-up guard time requirement RQ2' may simply define a stabilization time period that should be preserved before the predetermined time point at which the second functional block 706 is required to be ready to work, and the first wake-up guard time requirement RQ1' may simply define a sum of the stabilization time period required by the second functional block 706 and a stabilization time period that should be preserved before the first functional block 704 becomes stable and ready to work. However, the aforementioned settings of the first wake-up guard time requirement RQ1' and the second wake-up guard time requirement RQ2' are for illustrative purposes only, and are not meant to be limitations of the present invention. The settings of the first wake-up guard time requirement RQ1' and the second wake-up guard time requirement RQ2' may be adjusted according to actual design consideration.

Figure 8:
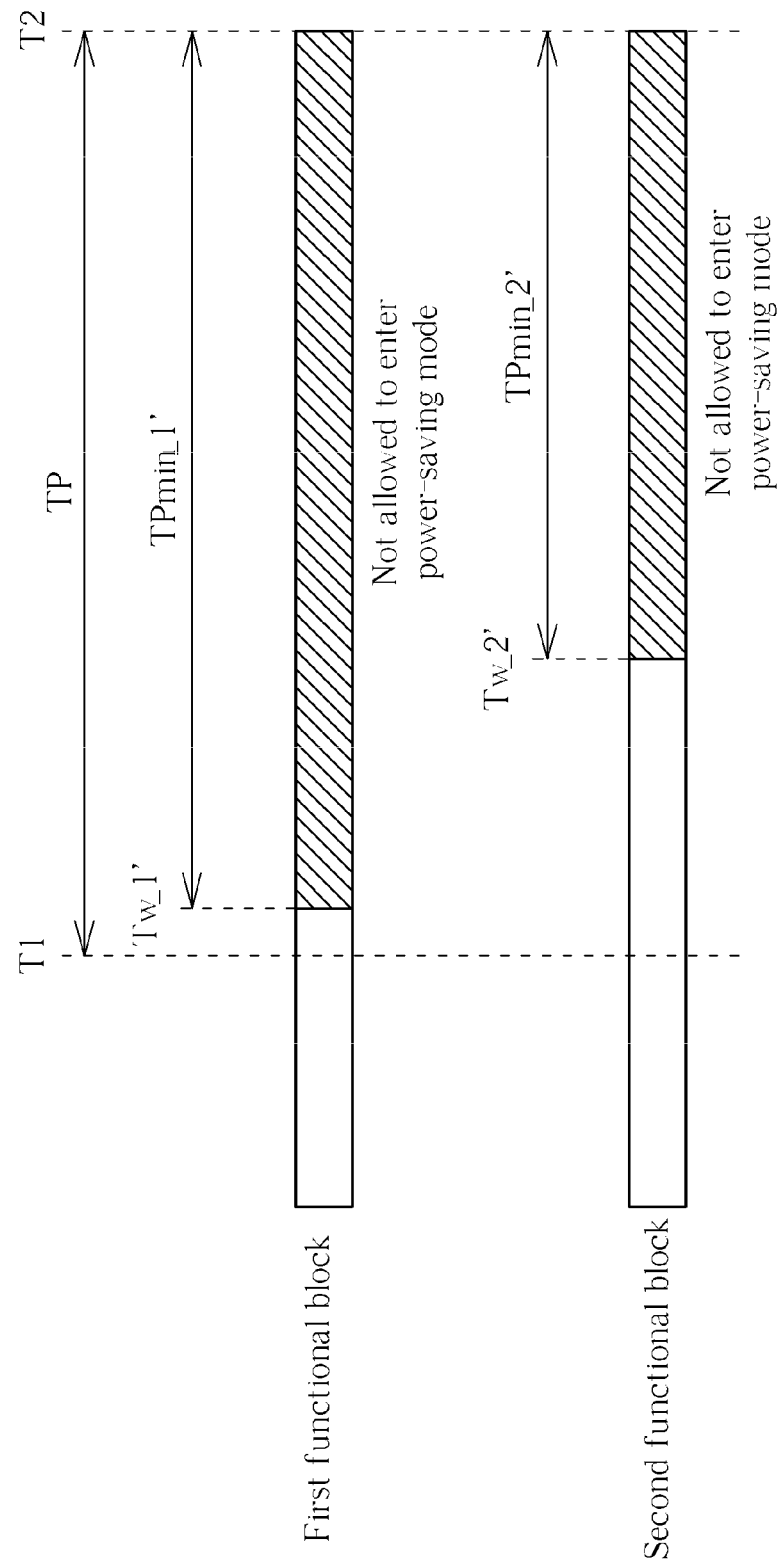
FIG. 8 is a diagram illustrating a first example of a minimum time period requested by a first wake-up guard time requirement of a first functional block in FIG. 7, a minimum time period requested by a second wake-up guard time requirement of a second functional block in FIG. 7, and a time period between a first time point and a second time point.

Please refer to FIG. 8, which is a diagram illustrating a first example of the minimum time period $TP_{min\_}1$ (e.g., a sum of stabilization time periods of the first functional block 704 and the second functional block 706) requested by the first wake-up guard time requirement RQ1', the minimum time period $TP_{min\_}2'$ (e.g., a stabilization time period of the second functional block 706) requested by the second wake-up guard time requirement RQ2', and the time period TP between the first time point T1 and the second time point T2. As shown in FIG. 8, the minimum time period $TP_{min\_}1'$ is equal to a time period delimited by a permissible latest wake-up time point $T_{w\_}1'$ for the first functional block 704 and the second time point T2, and the minimum time period $TP_{min\_}2'$ is equal to a time period delimited by a permissible latest wake-up time point $T_{w\_}2'$ for the second functional block 706 and the second time point T2. As can be seen from FIG. 8, the time period TP is longer than each of the minimum time periods $TP_{min\_}1'$ and $TP_{min\_}2'$. Therefore, the first checking result CR1' generated from the checking unit 112 in FIG. 7 would indicate that the time period TP satisfies the first wake-up guard time requirement RQ1', and the second checking result CR2' generated from the checking unit 112 would also indicate that the time period TP satisfies the second wake-up guard time requirement RQ2'.

Regarding the example shown in FIG. 8, the control unit 116 controls both of the first functional block 704 and the second functional block 706 to enter the power-saving mode at the first time point T1 since the first checking result CR1 indicates that the time period TP satisfies the first wake-up guard time requirement RQ1 and the second checking result CR2 indicates that the time period TP satisfies the second wake-up guard time requirement RQ2'. In addition, the calculating unit 114 calculates a first wake-up time point (e.g., the aforementioned permissible latest wake-up time point $T_{w\_}1'$) of the first functional block 704 according to the first wake-up guard time requirement RQ1' when the first functional block 104 enters the power-saving mode, and calculates a second wake-up time point (e.g., the aforementioned permissible latest wake-up time point $T_{w\_}2'$) for the second functional block 706. After receiving information of the wake-up time points from the calculating unit 114, the control unit 116 controls the first functional block 704 to switch from the power-saving mode to the normal mode at the designated wake-up time point $T_{w\_}1'$, and controls the second functional block 706 to switch from the power-saving mode to the normal mode at the designated wake-up time point $T_{w\_}2'$.

Figure 9:
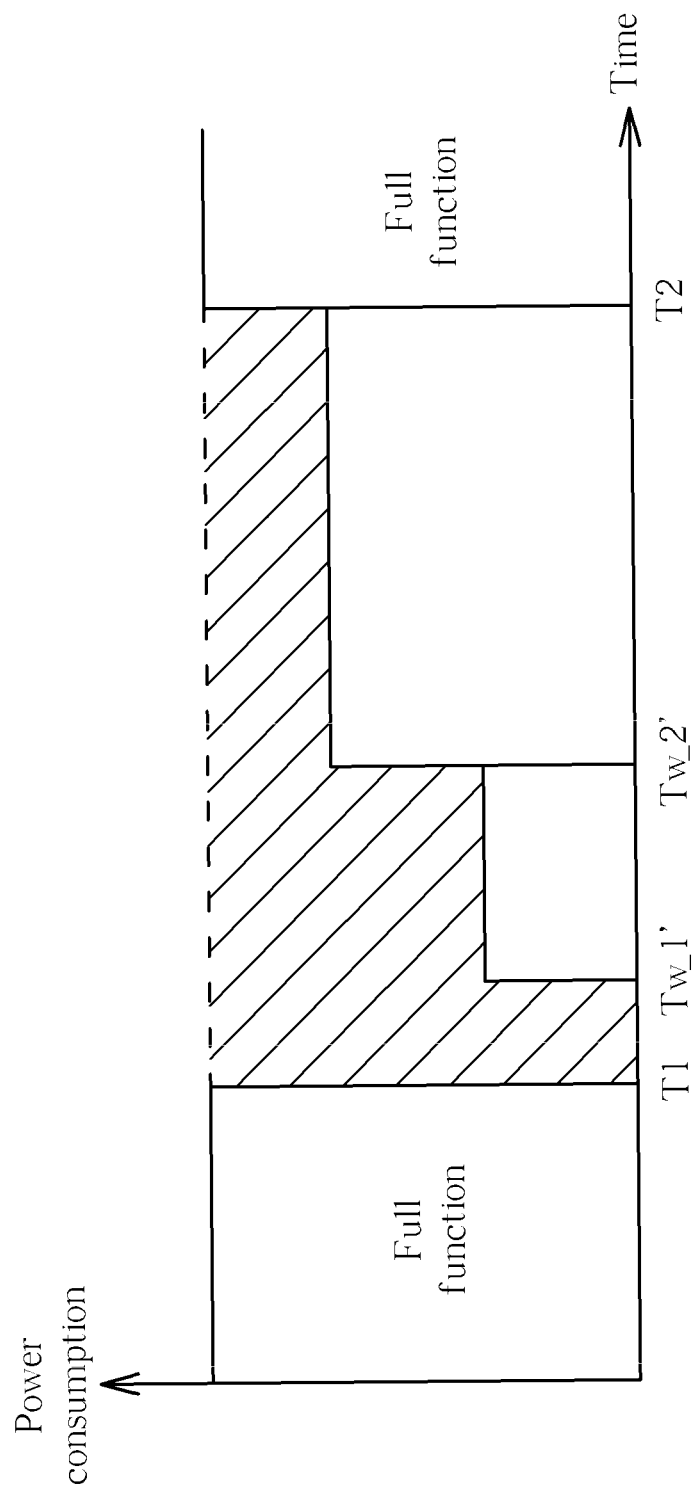
FIG. 9 is a diagram illustrating the power consumption variation of the electronic device in FIG. 7 under the condition where both of the first wake-up guard time requirement and the second wake-up guard time requirement are satisfied.

Please refer to FIG. 9, which is a diagram illustrating the power consumption variation of the electronic device 700 under the condition where both of the first wake-up guard time requirement RQ1' and the second wake-up guard time requirement RQ2' are satisfied. As can be seen from FIG. 9, the first functional block 704 and the second functional block 706 both enter the power-saving mode at the first time point T1 (e.g., at a time point where the system is idle). Suppose that the power supplies/power sources of the first functional block 704 and the second functional block 706 are cut off when the first functional block 704 and the second functional block 706 enters the power-saving mode. The power consumption would be reduced from a maximum level to a minimum level at the first time point T1. Next, the first functional block 704 and the second functional block 706 sequentially leave the power-saving mode under the control of the control unit 116. Therefore, the power consumption would be increased to higher levels. At the second time point T2 (i.e., a pre-scheduled/predetermined time point where the first functional block 704 and the second functional block 706 are required to be ready to work), the power consumption is increased to the maximum level again. It should be noted that the area marked by oblique lines represents the power saved due to the proposed power control scheme.

Figure 10:
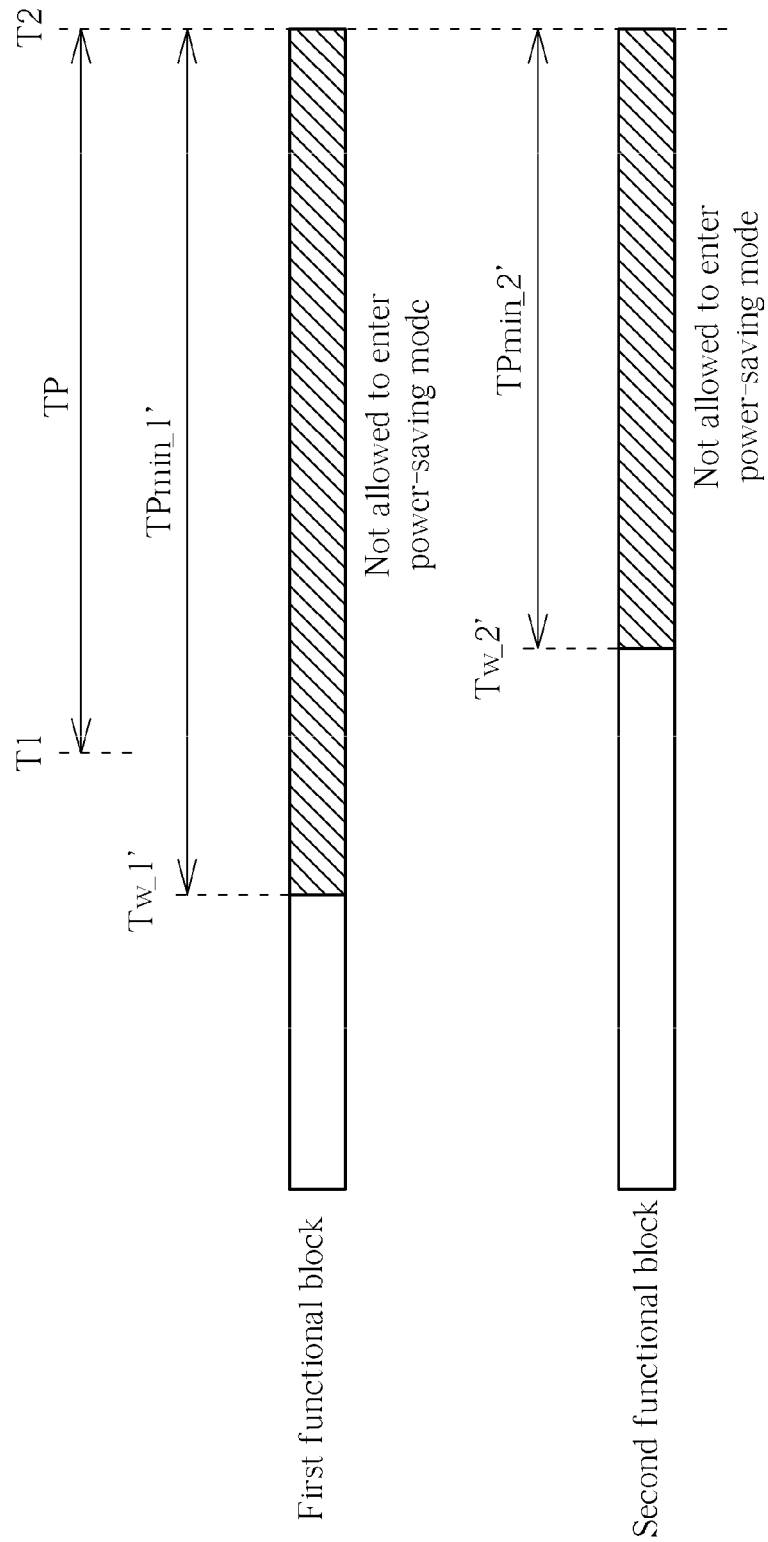
FIG. 10 is a diagram illustrating a second example of the minimum time period requested by the first wake-up guard time requirement of the first functional block in FIG. 7, the minimum time period requested by the second wake-up guard time requirement of the second functional block in FIG. 7, and the time period between the first time point and the second time point.

Please refer to FIG. 10, which is a diagram illustrating a second example of the minimum time period $TP_{min\_1}'$ (e.g., a sum of stabilization time periods of the first functional block 704 and the second functional block 706) requested by the first wake-up guard time requirement RQ1', the minimum time period $TP_{min\_2}'$ (e.g., a stabilization time period of the second functional block 706) requested by the second wake-up guard time requirement RQ2', and the time period TP between the first time point T1 and the second time point T2. As can be seen from FIG. 10, the time period TP is longer than the minimum time period $TP_{min\_2}'$, but is shorter than the other minimum time period $TP_{min\_1}'$. Therefore, the first checking result CR1' generated from the checking unit 112 would indicate that the time period TP does not satisfy the first wake-up guard time requirement RQ1', and the second checking result CR2' generated from the checking unit 112 would indicate that the time period TP satisfies the second wake-up guard time requirement RQ2'.

Regarding the example shown in FIG. 10, the control unit 116 makes the first functional block 704 stay in the normal mode since the first checking result CR1' indicates that the time period TP does not satisfy the first wake-up guard time requirement RQ1', and controls the second functional block 106 to enter the power-saving mode since the second checking result CR2' indicates that the time period TP satisfies the second wake-up guard time requirement RQ2'. In addition, the calculating unit 114 calculates the second wake-up time point (e.g., the aforementioned permissible latest wake-up time point $T_{w\_2}'$) of the second functional block 706 according to the second wake-up guard time requirement RQ2' when the second functional block 706 enters the power-saving mode. As the first functional block 704 is not allowed to enter the power-saving mode, the calculating unit 114 does not calculate a wake-up time point for the first functional block 704. Next, the control unit 116 controls the second functional block 706 to switch from the power-saving mode to the normal mode at the designated wake-up time point $T_{w\_2}'$.

Figure 11:
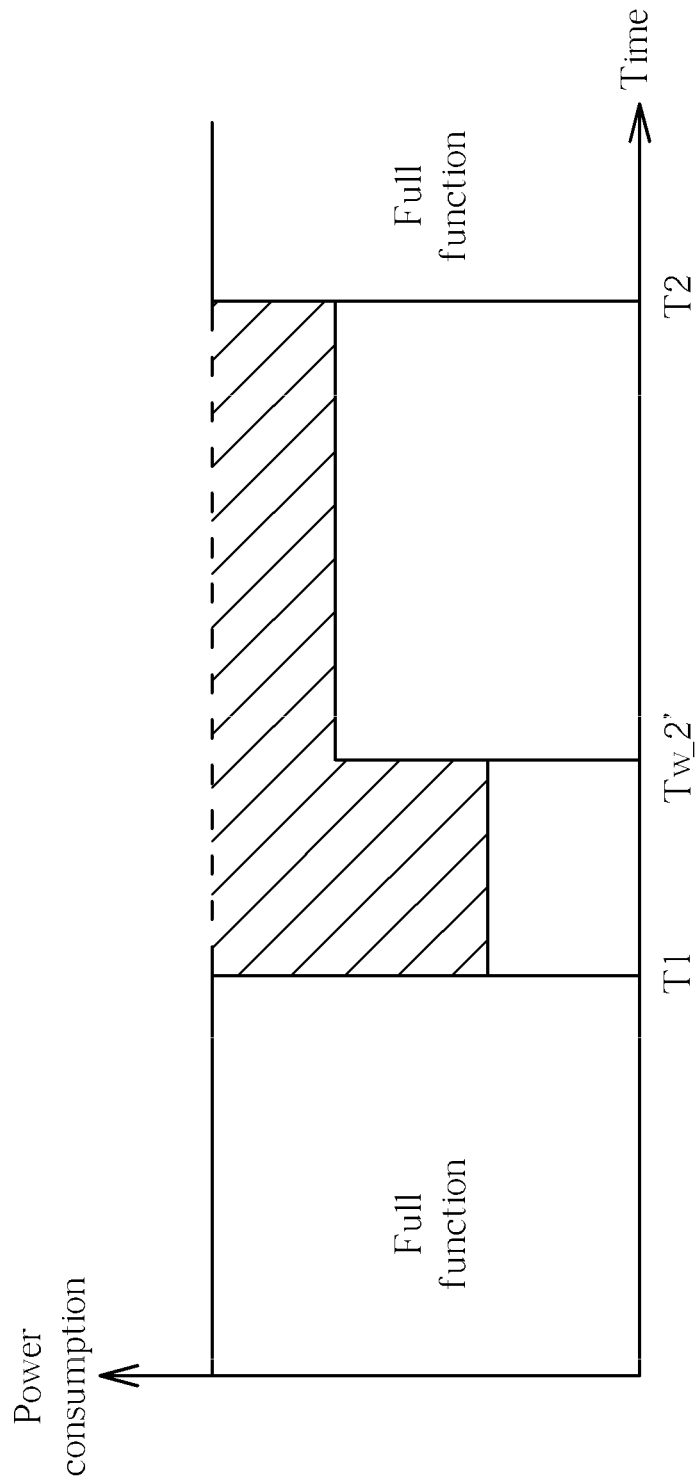
FIG. 11 is a diagram illustrating the power consumption variation of the electronic device in FIG. 7 under the condition where only one of the first wake-up guard time requirement and the second wake-up guard time requirement is satisfied.

Please refer to FIG. 11, which is a diagram illustrating the power consumption variation of the electronic device 700 under the condition where only one of the first wake-up guard time requirement RQ1' and the second wake-up guard time requirement RQ2' is satisfied. As can be seen from FIG. 11, the second functional block 706 enters the power-saving mode at the first time point T1 (e.g., at a time point where the system is idle). Suppose that the power supply/power source of the second functional block 706 is cut off when the second functional block 706 enters the power-saving mode. At the first time point T1, the power consumption would be reduced from a maximum level to a lower level which is higher than the minimum level shown in FIG. 9 due to the fact that the first functional block 704 is still operating under the normal mode. Next, the second functional block 706 leaves the power-saving mode at the second wake-up time point $T_{w\_2}'$ under the control of the control unit 116. Therefore, the power consumption would be increased to a higher level. At the second time point T2 (i.e., a pre-scheduled/predetermined time point where the first functional block 704 and the second functional block 706 are required to be ready to work), the power consumption is increased to the maximum level since the first functional block 704 and the second functional block 706 are both stable and ready to work. It should be noted that the area marked by oblique lines represents the power saved due to the proposed power control scheme.

Regarding the example shown in FIG. 10, the electronic device 700 is partially active as the second functional block 706 enters the power-saving mode while the first functional block 704 remains in the normal mode. Though the first functional block 704 is not allowed to enter the power-saving mode, the power consumption is still reduced during the time period TP, as shown in FIG. 11.

Figure 12:
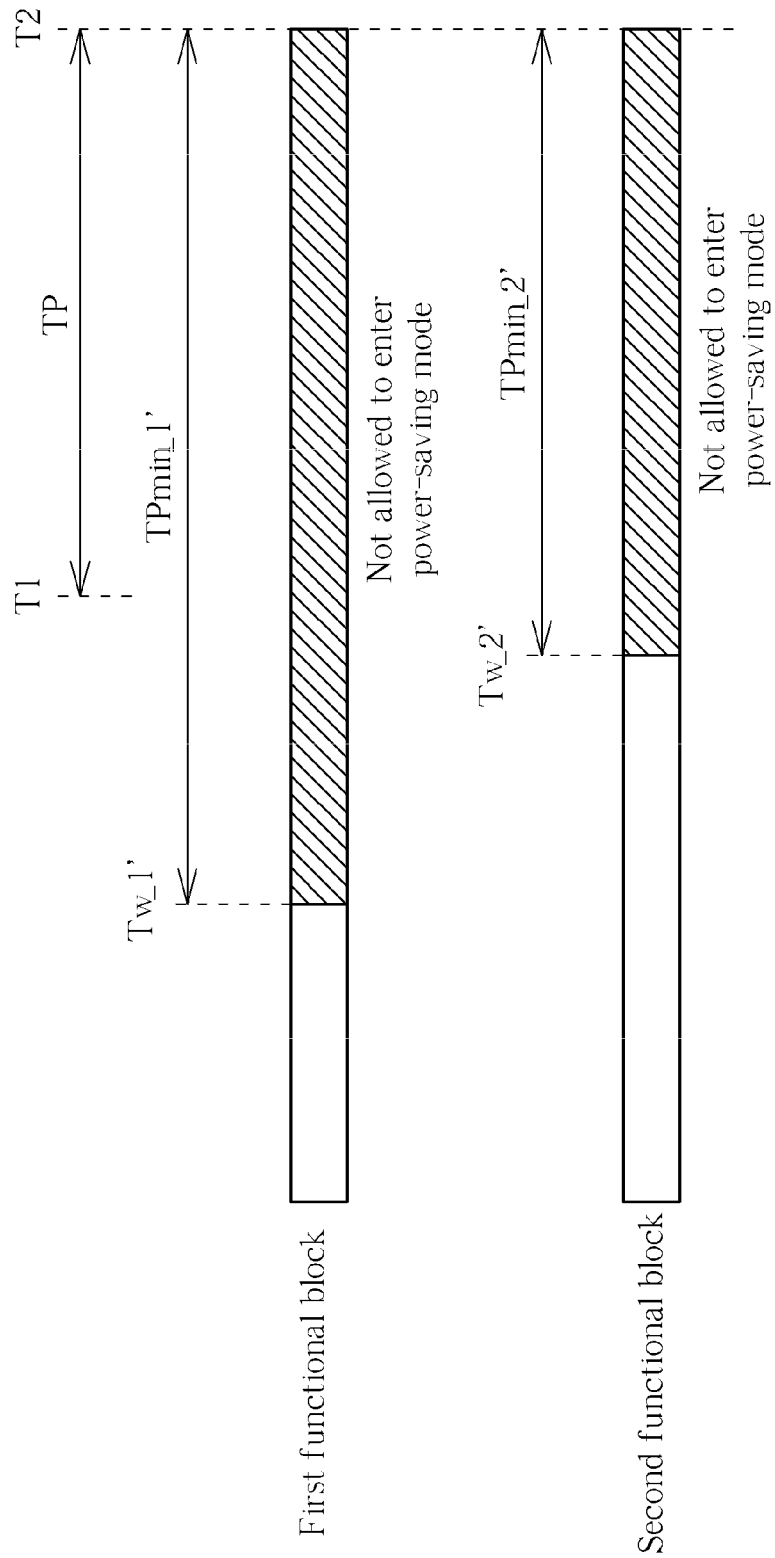
FIG. 12 is a diagram illustrating a third example of the minimum time period requested by the first wake-up guard time requirement of the first functional block in FIG. 7, the minimum time period requested by the second wake-up guard time requirement of the second functional block in FIG. 7, and the time period between the first time point and the second time point.

Please refer to FIG. 12, which is a diagram illustrating a third example of the minimum time period $TP_{min\_1}'$ (e.g., a sum of stabilization time periods of the first functional block 704 and the second functional block 706) requested by the first wake-up guard time requirement RQ1', the minimum time period $TP_{min\_1}'$ (e.g., a stabilization time period of the second functional block 706) requested by the second wake-up guard time requirement RQ2', and the time period TP between the first time point T1 and the second time point T2. As can be seen from FIG. 12, the time period TP is shorter than each of the minimum time periods $TP_{min\_1}'$ and $TP_{min\_2}'$. Therefore, the first checking result CR1' generated from the checking unit 112 would indicate that the time period TP does not satisfy the first wake-up guard time requirement RQ1', and the second checking result CR2' generated from the checking unit 112 would indicate that the time period TP does not satisfy the second wake-up guard time requirement RQ2'. Regarding the example shown in FIG. 12, the control unit 116 makes the first functional block 704 stay in the normal mode since the first checking result CR1' indicates that the time period TP does not satisfy the first wake-up guard time requirement RQ1', and makes the second functional block 706 stay in the normal mode since the second checking result CR2' indicates that the time period TP does not satisfy the second wake-up guard time requirement RQ2'. As none of the first functional block 704 and the second functional block 706 is allowed to enter the power-saving mode, the calculating unit 114 does not calculate any wake-up time point for the first functional block 704 and the second functional block 706. In addition, the power consumption would be kept at the maximum level during the time period TP due to the fact that neither the first functional block 704 nor the second functional block 706 enters the power-saving mode.

Figure 13:
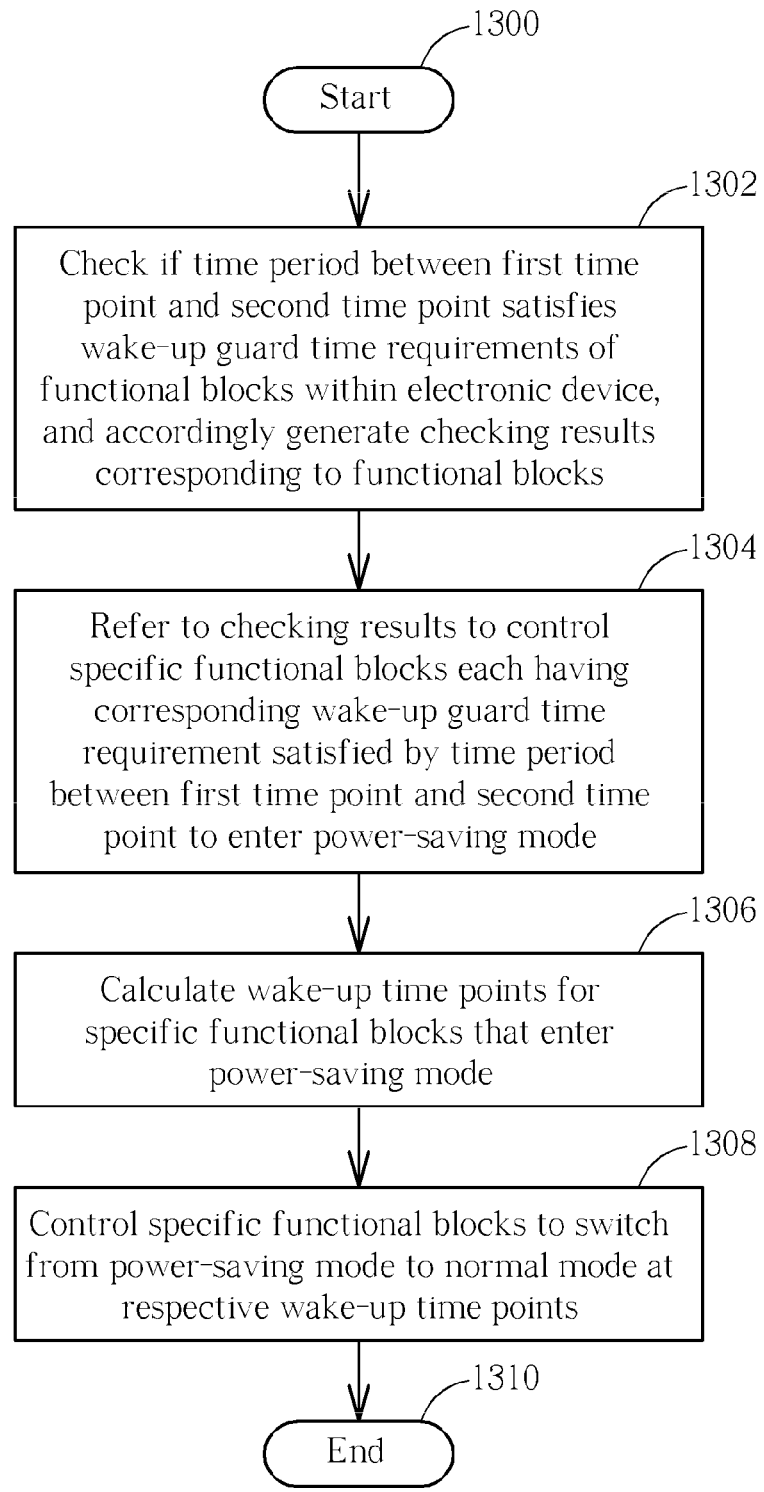
FIG. 13 is a flowchart illustrating a power control method according to an exemplary embodiment of the present invention.

FIG. 13 is a flowchart illustrating a power control method according to an exemplary embodiment of the present invention. Provided that the result is substantially the same, steps are not required to be executed in the exact order shown in FIG. 13. The exemplary power control method may be employed by either of the electronic devices 100 and 700, and may be briefly summarized by following steps.

Step 1300: Start.

Step 1302: Check if a time period between a first time point and a second time point satisfies wake-up guard time requirements of a plurality of functional blocks within an electronic device (e.g., a wireless communication device), and accordingly generate a plurality of checking results corresponding to the functional blocks. For example, the first time point may be a time point at which a system idle event occurs, and the second time point may be a scheduled time point at which the functional blocks are required to be ready to work.

Step 1304: Refer to the checking results to control specific functional blocks, each having a corresponding wake-up guard time requirement satisfied by the time period between the first time point and the second time point, to enter the power-saving mode.

Step 1306: Calculate wake-up time points for the specific functional blocks that enter the power-saving mode.

Step 1308: Control the specific functional blocks to switch from the power-saving mode to the normal mode at respective designated wake-up time points.

Step 1310: End.

As a person skilled in the art can readily understand details of the steps shown in FIG. 13 after reading paragraphs directed to the electronic devices 100 and 700, further description is omitted here for brevity.

The exemplary electronic device 100 shown in FIG. 1 includes a plurality of functional blocks with independent wake-up procedures, and the exemplary electronic device 700 shown in FIG. 7 includes a plurality of functional blocks with dependent wake-up procedures. However, a person skilled in the art should readily appreciate that the proposed power control method of the present invention may also be employed in an electronic device including a plurality of functional blocks with independent wake-up procedures and dependent wake-up procedures. To put it simply, any electronic device employing the proposed power control method to control the functional blocks individually for power consumption reduction falls within the scope of the present invention.

In one exemplary implementation, the functional blocks included in the electronic device 100/700 may be digital circuits. In another exemplary implementation, the functional blocks included in the electronic device 100/700 may be analog circuits. Taking a digital circuit for example, it may be required to load needed parameters/settings during the above-mentioned stabilization time period. That is, when the needed parameters/settings are successfully loaded, the digital circuit may be regarded as a circuit ready to work. Taking an analog circuit for example, it may be regarded as a circuit ready to work when internal analog components have been properly started up.

In contrast to the conventional design, the exemplary power control scheme proposed in the present invention is capable of controlling operational modes of a plurality of functional blocks individually by referring to respective wake-up guard time requirements of the functional blocks, thereby achieving improved power saving performance.

Those skilled in the art will readily observe that numerous modifications and alterations of the device and method may be made while retaining the teachings of the invention.

What is claimed is:

1. An electronic device, comprising:
a first functional block, having a first wake-up guard time requirement;
a second functional block, having a second wake-up guard time requirement which is different from the first wake-up guard time requirement; and
a control circuit, coupled to the first functional block and the second functional block, for selectively controlling the first functional block to switch from a normal mode to a power-saving mode by referring to the first wake-up guard time requirement, and selectively controlling the second functional block to switch from the normal mode to the power-saving mode by referring to the second wake-up guard time requirement.

2. The electronic device of claim 1, wherein the control circuit comprises:
a checking unit, arranged to generate a first checking result by checking if a time period between a first time point and a second time point satisfies the first wake-up guard time requirement and generate a second checking result by checking if the time period between the first time point and the second time point satisfies the second wake-up guard time requirement; and
a control unit, coupled to the checking unit, for selectively controlling the first functional block to enter the power-saving mode according to the first checking result and selectively controlling the second functional block to enter the power-saving mode according to the second checking result.

3. The electronic device of claim 2, wherein the first time point is a time point at which a system idle event occurs, and the second time point is a scheduled time point at which the first functional block and the second functional block are required to be ready to work.

4. The electronic device of claim 1, wherein a wake-up procedure of the second functional block is dependent on a wake-up procedure of the first functional block.

5. The electronic device of claim 1, wherein a wake-up procedure of the second functional block is independent of a wake-up procedure of the first functional block.

6. The electronic device of claim 1, being a wireless communication device.

7. The electronic device of claim 1, wherein each wake-up guard time requirement of a corresponding functional block defines a minimum time period, starting from a specific time point and ending at a predetermined time point, required for guaranteeing that waking up the corresponding functional block at the specific time point is able to make the electronic device ready to work at the predetermined time point.

8. A power control method, comprising:
selectively controlling a first functional block of an electronic device to switch from a normal mode to a power-saving mode by referring to a first wake-up guard time requirement of the first functional block; and
selectively controlling a second functional block of the electronic device to switch from the normal mode to the power-saving mode by referring to a second wake-up guard time requirement of the second functional block, wherein the second wake-up guard time requirement is different from the first wake-up guard time requirement.

9. The power control method of claim 8, wherein selectively controlling the first functional block of the electronic device to switch from the normal mode to the power-saving mode comprises:
generating a first checking result by checking if a time period between a first time point and a second time point satisfies the first wake-up guard time requirement; and
selectively controlling the first functional block to enter the power-saving mode according to the first checking result; and
selectively controlling the second functional block of the electronic device to switch from the normal mode to the power-saving mode comprises:
generating a second checking result by checking if the time period between the first time point and the second time point satisfies the second wake-up guard time requirement; and
selectively controlling the second functional block to enter the power-saving mode according to the second checking result.

10. The power control method of claim 9, wherein the first time point is a time point at which a system idle event occurs, and the second time point is a scheduled time point at which the first functional block and the second functional block are required to be ready to work.

11. The power control method of claim 8, wherein a wake-up procedure of the second functional block is dependent on a wake-up procedure of the first functional block.

12. The power control method of claim 8, wherein a wake-up procedure of the second functional block is independent of a wake-up procedure of the first functional block.

13. The power control method of claim 8, wherein the electronic device is a wireless communication device.

14. The power control method of claim 8, wherein each wake-up guard time requirement of a corresponding functional block defines a minimum time period, starting from a specific time point and ending at a predetermined time point, required for guaranteeing that waking up the corresponding functional block at the specific time point is able to make the electronic device ready to work at the predetermined time point.

15. An electronic device, comprising:
a plurality of functional blocks, having different wake-up guard time requirements, respectively; and
a control circuit, coupled to the functional blocks, for controlling a part of the functional blocks to switch from a normal mode to a power-saving mode by referring to the wake-up guard time requirements of the functional blocks.

16. The electronic device of claim 15, wherein each functional block included in the part of the functional blocks has a wake-up guard time requirement that is satisfied by a time period between a first time point and a second time point, and each functional block included in a remaining part of the functional blocks has a wake-up guard time requirement that is not satisfied by the time period between the first time point and the second time point.

17. The electronic device of claim 16, wherein the first time point is a time point at which a system idle event occurs, and the second time point is a scheduled time point at which the functional blocks are required to be ready to work.

18. The electronic device of claim 15, wherein a wake-up procedure of one functional block included in the part of the functional blocks is dependent on a wake-up procedure of another functional block included in a remaining part of the functional blocks.

19. The electronic device of claim 15, wherein a wake-up procedure of one functional block included in the part of the functional blocks is independent of a wake-up procedure of another functional block included in a remaining part of the functional blocks.

20. The electronic device of claim 15, wherein each wake-up guard time requirement of a corresponding functional block defines a minimum time period, starting from a specific time point and ending at a predetermined time point, required for guaranteeing that waking up the corresponding functional block at the specific time point is able to make the electronic device ready to work at the predetermined time point.

21. An electronic device, comprising:
a plurality of functional blocks, having different wake-up guard time requirements, respectively; and
a control circuit, coupled to the functional blocks, for controlling the functional block to switch from a normal mode to a power-saving mode by referring to the different wake-up guard time requirements, respectively, calculating a plurality of wake-up time points for the functional blocks according to the different wake-up guard time requirements, and controlling the functional blocks to switch from the power-saving mode to the normal mode by referring to the wake-up time points of the functional blocks, respectively.

22. The electronic device of claim 21, wherein each wake-up guard time requirement of a corresponding functional block defines a minimum time period, starting from a specific time point and ending at a predetermined time point, required for guaranteeing that waking up the corresponding functional block at the specific time point is able to make the electronic device ready to work at the predetermined time point.

* * * * *